Jan. 14, 1936.　　　　G. A. BARKER　　　　2,027,365

WINDSHIELD CLEANING DEVICE

Filed Feb. 14, 1934

Inventor
George A. Barker

By *[signature]*
Attorney

Patented Jan. 14, 1936

2,027,365

UNITED STATES PATENT OFFICE 2,027,365

WINDSHIELD CLEANING DEVICE

George A. Barker, Rochester, N. Y.

Application February 14, 1934, Serial No. 711,211

6 Claims. (Cl. 15—255)

(Granted under the act of March 3, 1883, as amended April 30, 1928; 370 O. G. 757)

This invention described herein may be manufactured and used by or for the Government for Governmental purposes, without the payment to me of any royalty thereon.

This invention relates to cleaners for curved windshields of automobiles and the like and has for its object to provide a construction simple to manufacture and more efficient in operation than those heretofore proposed.

With these and other objects in view the invention resides in the novel details of construction and combinations of parts, as will be disclosed more fully hereinafter and particularly pointed out in the claims.

Referring to the accompanying drawing forming a part of this specification and in which like numerals designate like parts in all the views.

In order that this invention may be better understood attention is directed to Patent No. 1,944,160, by George A. Barker, for a Windshield in which is disclosed a construction of varied curvature and to Patent No. 1,982,624, for Improvements in windshield cleaner, in which latter there was disclosed a device capable of cleaning a specified portion of the surface of a windshield which was not flat but which, on the other hand, possessed a surface which was curved. Further, the curvature of said surface could be in one or plural planes, or in other words said surface could be that of a cylinder or said surface could be spherical, or a modification of a spherical surface in that the surface would be of constantly changing curvature. In combination with such a windshield cleaner there was disclosed a mechanism for moving the wiper blade of the cleaner, consisting principally of a shaft which was given oscillatory motion with simultaneous bodily axial movement. The present invention is also directed to a cleaner for curved windshields but differs from that just mentioned above principally in the mechanism for actuating the wiper blade.

Figure 1:
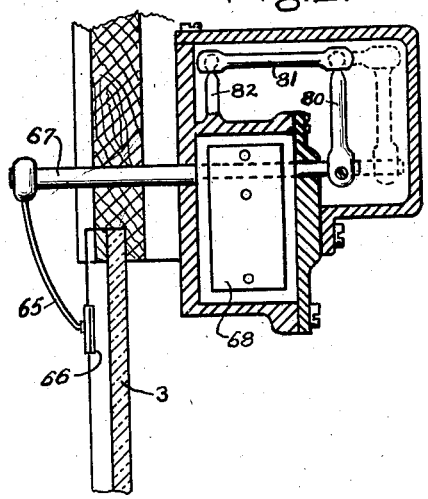
Fig. 1 is a vertical sectional view of a windshield cleaner mechanism.
Figure 2:
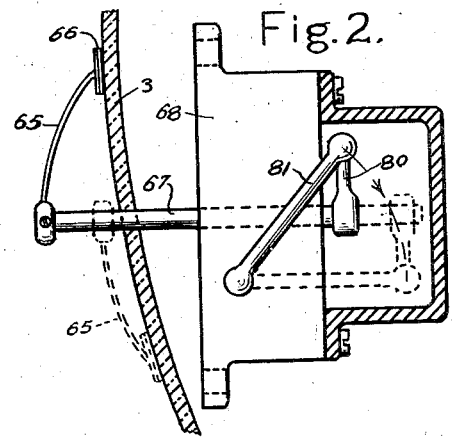
Fig. 2 is a horizontal view partly in section of the parts shown in Fig. 1.

According to the present invention and referring particularly to Figs. 1 and 2 there is shown a casing (68) containing a motor of any well known construction for imparting an oscillatory motion to the shaft (67), one end of which extends forwardly of the casing and has mounted on its end one end of the wiper arm (65), the other end of which has secured thereto the wiper blade (66). Said shaft has its opposite end extending rearwardly out of said casing and rigidly secured thereto is a radially extending rod (80) the outermost end of which has a ball and socket connection with one end of a link (81) whose other end has a similar connection with the upper end of a lug or post (82) carried by said casing.

From the foregoing description it will therefore be understood that when the shaft (67) is oscillated, the rod (80) will be swung circularly, its outermost end moving in an arc of a circle whose center is the axis of the shaft. However the post or lug (82) is mounted laterally of a vertical plane passing through the shaft as distinctly shown in Fig. 2, and therefore during the swing of the rod (80) its outer end will be moved in the direction indicated by the dashed arrow line in said figure, resulting in an axial movement of the shaft as indicated by the dotted line showing. Thus here again there is provided a mechanism for establishing simultaneous oscillation and longitudinally slidable movement of a shaft, and the location of the post (82), its length as well as the dimensions of the rod (80) and the connecting link (81) can all be made in accordance with the desired movement of the windshield wiper blade to maintain the relationship of contact desired with the windshield surface.

It is obvious that those skilled in the art may vary the details of construction and arrangement of parts without departing from the spirit of the invention, and therefore it is not desired to be limited to the foregoing except as may be required by the claims.

Having described my invention, what I claim as new and wish to secure by Letters Patent, is:

1. In a cleaner for a windshield having a curved surface, a wiper blade, a slidable shaft supporting said blade, said shaft carried by a housing and connected to a motor in the housing to receive oscillatory movement, and a pivoted connection between said shaft and the housing for imparting a longitudinal movement to said shaft during its oscillation, said connection comprising a rod fixed to said shaft, a lug extending from the housing and a link universally connecting said rod and said lug.

2. In a cleaner for a windshield having a curved surface, a wiper blade, a longitudinally slidable shaft supporting said blade, said shaft pivotally carried by a relatively fixed housing and connected to a motor in the housing to receive oscillatory movement, and a pivoted connection between said shaft and the housing for imparting a longitudinal movement to said shaft during its oscillation, said connection comprising a rod fixed to said shaft, a lug extending from the housing, and a link connecting the extremities of said rod and said lug.

3. In a cleaner for a windshield having a curved surface, a wiper blade, a longitudinally slidable shaft supporting said blade, said shaft pivotally carried by a relatively fixed housing and connected to a motor in the housing to receive oscillatory movement, and a pivoted connection between said shaft and the housing for imparting longitudinal movement to said shaft during its oscillation, said connection comprising a rod fixed to said shaft, a lug extending from the housing and disposed to one side of the vertical plane passing through the axis of said shaft, and a link connecting said rod and said lug.

4. In a cleaner for a windshield having a curved surface, a wiper blade, a longitudinally slidable shaft supporting said blade, said shaft pivotally carried by a relatively fixed housing and connected to a motor in the housing to receive oscillatory movement, and a pivoted connection between said shaft and the housing for imparting a longitudinal movement to said shaft during its oscillation, said connection comprising a rod fixed to said shaft and extending radially therefrom, a lug extending from the housing in the same general direction as said rod, and a link connecting the extremities of said rod and said lug.

5. In a cleaner for a windshield having a curved surface, a wiper blade, a longitudinally slidable shaft supporting said blade, said shaft pivotally carried by a relatively fixed housing to receive oscillatory movement, and a pivoted connection between said shaft and the housing for imparting a longitudinal movement to said shaft during its oscillation, said connection comprising a rod fixed to said shaft, a lug extending from the housing, and a link connecting said rod and said lug.

6. In a cleaner for a windshield having a curved surface, a wiper blade, a longitudinally slidable shaft supporting said blade, said shaft pivotally carried by a relatively fixed housing and connected to a motor in the housing to receive oscillatory movement, and a positive link connection between said shaft and the housing adapted to impart a longitudinal movement to said shaft during its oscillation.

GEORGE A. BARKER.